(12) United States Patent
Yang

(10) Patent No.: US 10,761,365 B2
(45) Date of Patent: Sep. 1, 2020

(54) DISPLAY MODULE AND MANUFACTURING METHOD

(71) Applicant: Wuhan China Star Optoelectronics Technology Co., Ltd., Wuhan, Hubei (CN)

(72) Inventor: Yong Yang, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 420 days.

(21) Appl. No.: 15/578,691

(22) PCT Filed: Nov. 21, 2017

(86) PCT No.: PCT/CN2017/112184
§ 371 (c)(1),
(2) Date: Nov. 30, 2017

(87) PCT Pub. No.: WO2019/085058
PCT Pub. Date: May 9, 2019

(65) Prior Publication Data
US 2020/0133059 A1 Apr. 30, 2020

(30) Foreign Application Priority Data
Oct. 31, 2017 (CN) .......................... 2017 1 1043871

(51) Int. Cl.
*G02F 1/1335* (2006.01)
*G02F 1/1333* (2006.01)

(52) U.S. Cl.
CPC .. *G02F 1/133528* (2013.01); *G02F 1/133308* (2013.01); *G02F 1/133502* (2013.01); *G02F 2001/133331* (2013.01)

(58) Field of Classification Search
CPC ......... G02F 1/133528; G02F 1/133308; G02F 1/133502; G02F 2001/133331;
(Continued)

(56) References Cited

U.S. PATENT DOCUMENTS 5,990,992 A * 11/1999 Hamanaka ........... G02B 3/0031
349/158
6,147,732 A * 11/2000 Aoyama ............... G02B 5/3083
349/112
(Continued)

FOREIGN PATENT DOCUMENTS

| CN | 1696823 A | 11/2005 |
| CN | 201041589 Y | 3/2008 |
| CN | 103730193 A | 4/2014 |
| CN | 204389727 U | 6/2015 |

(Continued)

*Primary Examiner* — Shan Liu
(74) *Attorney, Agent, or Firm* — Hemisphere Law, PLLC; Zhigang Ma

(57) ABSTRACT

The present invention provides a display module which comprises a display panel, a cover, and an upper polarizer. The upper polarizer is attached to a light emitting surface. The cover is disposed on the upper polarizer, and a first microstructure has a curved concave surface is on the cover. A second microstructure having curved convex surface is on the upper polarizer and faces to the cover, and the first microstructure is corresponding to the second microstructure. The present invention also provides a manufacturing of display module. In the present invention, the cover of the display module and the surface of the upper polarizer are subjected to a special anti-glare surface treatment so that the microstructure on the surface of the cover and the microstructure of the surface of the upper polarizer form a substantially complementary relationship to achieve better anti-glare effect.

6 Claims, 3 Drawing Sheets

(58) Field of Classification Search
CPC .... G02F 1/116; G02F 1/133509; G02F 1/216;
G02F 2001/133521; G02F 1/0311; G02F
1/1335; G02F 1/133536; G02F 1/13362;
G02F 1/133533; G02F 2001/133531;
G02F 2001/13356; G02F 2001/133538;
G02F 2001/133541; G02F 2001/133543;
G02F 2001/133545; G02F 2001/133548;
G02F 2001/13355; G02F 2001/133562;
G02F 2001/133567; G02F 2203/16;
G02B 5/0294; G02B 6/3532; G02B
5/3033; G02B 6/0056; G02B 6/02109;
G03G 15/0435; H01J 9/205; B29D
11/00644; B32B 17/10458; B32B
2307/42; H01L 51/5293; H01R 12/7005;
H04B 10/532; G01J 5/0825; G03F
9/7065; G01R 33/3678; C09K 19/0208
USPC .................................................. 349/96–105
See application file for complete search history.

(56) References Cited

U.S. PATENT DOCUMENTS

| | | | |
|---|---|---|---|
| 2004/0169791 A1* | 9/2004 | Nilsen ...................... | G02B 1/11 349/96 |
| 2007/0046874 A1* | 3/2007 | Adachi ............. | G02F 1/133308 349/122 |
| 2009/0179543 A1* | 7/2009 | Fujimoto .......... | G02F 1/133502 313/110 |
| 2010/0238548 A1* | 9/2010 | Watanabe ................ | G02B 1/04 359/488.01 |
| 2014/0152908 A1* | 6/2014 | Nimura ............. | G02F 1/133526 349/8 |
| 2015/0092141 A1* | 4/2015 | Peng ...................... | B32B 37/12 349/96 |
| 2015/0273792 A1* | 10/2015 | Tazawa .................... | C09J 7/385 428/142 |
| 2016/0245955 A1* | 8/2016 | Eguchi ...................... | B32B 7/02 |
| 2017/0102486 A1* | 4/2017 | Liu ........................ | G02B 5/305 |
| 2018/0162091 A1* | 6/2018 | Takeda ...................... | B32B 7/02 |

* cited by examiner

ND MANUFACTURING
DISPLAY MODULE AND MANUFACTURING METHOD

RELATED APPLICATIONS

The present application is a National Phase of International Application Number PCT/CN2017/112184, filed Nov. 21, 2017, and claims the priority of China Application No. 201711043871.1, filed Oct. 31, 2017.

BACKGROUND OF THE INVENTION

1. Field of the Invention

The present application relates to the display technology, and more particularly to a display module and a manufacturing method.

2. The Related Arts

In order to solve this problem that mobile phone consumers often suffer from ambient light in using mobile phones in a bright environment, the commonly used method is to perform surface treatment on the mobile phone cover and increase the diffusion of the phone cover surface to achieve the antiglare effect. However, the anti-glare surface treatment will cause the cover to have a sparkle on the module, which may affect the viewing comfort. The research shows that the smaller particle size of the anti-dazzling microstructure on the cover is smaller, and then the sparkle phenomenon is less. However, the particle size reduction will not only increase the difficulty of the process, but also reduce the effect of anti-dazzle. It is not conducive to the cover anti-dazzle performance promotion.

SUMMARY

In view of the shortcomings of the prior art, the present invention provides a display module and a manufacturing method to achieve the antiglare effect with no sparkle. It also does not increase the difficulty of the process and enhance the user experience.

In order to achieve the aforesaid purpose, this present invention uses the technology method:

A display module comprises a display panel, a cover, and an upper polarizer. The upper polarizer is attached to a light emitting surface. The cover is disposed on the upper polarizer, and a first microstructure has a curved concave surface is on the cover. A second microstructure having curved convex surface is on the upper polarizer and faces to the cover, and the first microstructure is corresponding to the second microstructure.

As one of the embodiments, a third microstructure having a curved concave is arranged on an inner surface of the cover. Each of the first microstructure is corresponding to either the second microstructure or the third microstructure.

As one of the embodiments, a projection image of each of the third microstructure on the upper polarizer is between the second microstructure.

As one of the embodiments, the third microstructure has the same curvature radius as the second microstructure.

As one of the embodiments, the first microstructure has the same curvature radius as the second microstructure.

This present invention also provides another display module comprises a display panel and a cover. The cover is arranged above a light emitting direction of the display panel, and a first microstructure having a curved concave is on an outer surface of the cover. A third microstructure having a curved concave surface is on an inner surface of the cover, and the third microstructure is corresponding to the first microstructure.

As one of the embodiments, the amount of the first microstructure is the same as the third microstructure, and the location of each of the first microstructure is corresponding to the third microstructure.

As one of the embodiments, the first microstructure has the same curvature radius as the third microstructure.

Another purpose of the present invention is to provide a manufacturing method of a display module comprises:

preparing a cover which comprises depositing a first hard mask layer on a transparent plate by vapor deposition, etching the transparent plate to form a first microstructure having a curved concave on a region of the transparent plate which is not covered by the first hard mask; and removing the first hard mask;

preparing an upper polarizer which comprises depositing a second hard mask on an upper surface of the upper polarizer by vapor deposition; and spraying particles on the upper polarizer with the second hard mask;

The upper polarizer which attach to the cover to a light emitting surface of a display panel is located between the display panel and the cover.

As one of the embodiments, the cover is attached to the upper polarizer with an optical glue layer.

In the present invention, subject to a special anti-glare surface treatment to the cover of the display module and the surface of the upper polarizer, the microstructure on the surface of the cover and the microstructure of the surface of the upper polarizer form a substantially complementary relationship to achieve better anti-glare effect. To a certain extent, it eliminates the speckle phenomenon, and does not significantly increase the difficulties of the process.

DETAILED DESCRIPTION OF THE PREFERRED EMBODIMENTS

In order to make the objectives, technical solutions and advantages of the present invention more comprehensible, the present invention is further described in detail below with reference to the accompanying drawings and embodiments. It should be understood that the specific embodiments described are merely used to explain the present invention, and are not intended to limit the present invention.

It should be noted that in the present invention, the directions or positional relationships indicated by the terms "up", "down", "inside", "outside", "vertical" and "horizontal" or the relationship of the location. These terms are used primarily to better describe the invention and its embodiments, and are not intended to limit the particular orientations, indicated devices, modules, specific components, or to construct and operate in a particular orientation. For those skilled in the art, the specific meanings of these terms in the present invention could be understood as in the substantial situation.

Embodiment 1

Figure 1:
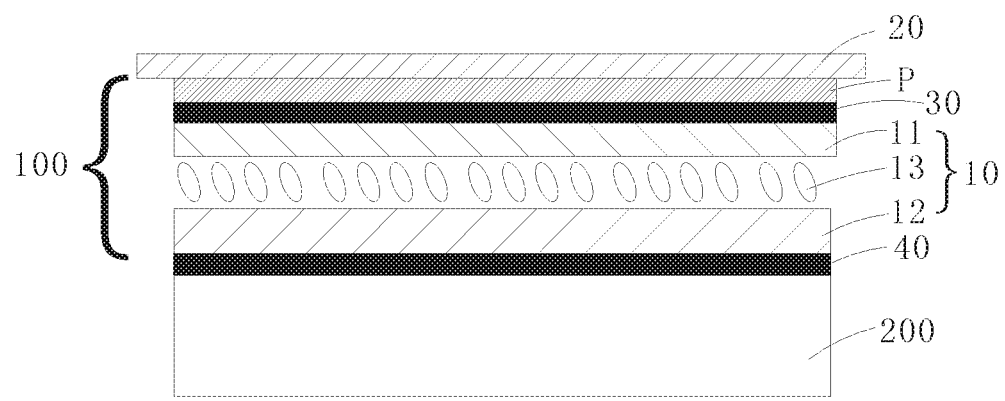
FIG. 1 is a schematic structural diagram of a display device according to the first embodiment of the present invention.

Referring to FIG. 1, the display device in this present embodiment comprises display module 100 and backlight module 200. The display module 100 comprises a display panel 10, a transparent cover 20 and an upper polarizer 30. The upper polarizer 30 is attached to a light emitting surface of the display panel 10. The cover 20 is disposed on the upper polarizer 30, and a first microstructure 21 has a curved concave surface is on the cover 20. A second microstructure 31 having curved convex surface is on the upper polarizer 30 and faces to the cover 20, and the first microstructure 21 is corresponding to the second microstructure 31.

In the present embodiment, the display panel 10 is crystal panel. The display module 100 has a lower polarizer 40. The lower polarizer 40 is attached to the lower surface of the display panel 10. The backlight module 200 is located between display panel 10 and the light-emitting surface of the backlight module 200. The backlight light emitted by the backlight module 200 is polarized by the lower polarizer 40 and enters the display panel 10. Finally, the light is emitted from the upper polarizer 30 and the cover 20. There is also a transparent optical adhesive layer (OCA) P between the cover 20 and the upper polarizer 30 for ensuring the adhesive tightness and the flatness of the cover 20 and the upper polarizer 30.

Figure 2:
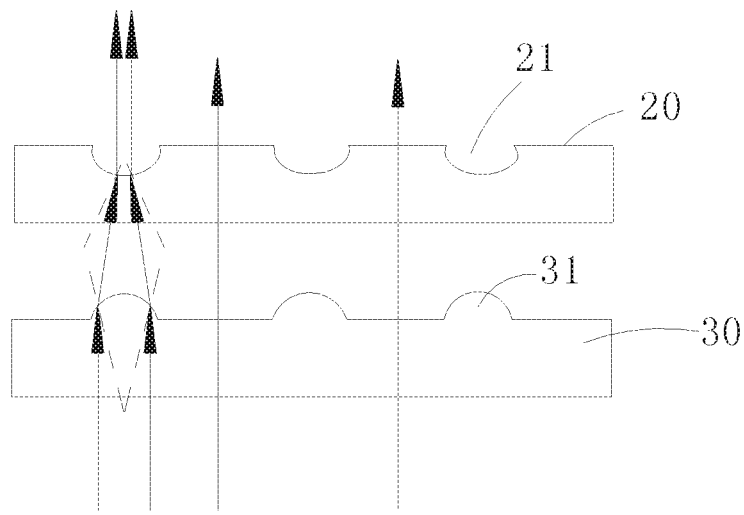
FIG. 2 is a schematic diagram of the cooperation of the cover and the upper polarizer of the first embodiment of the present invention.

Referring to FIG. 2, in the display module 100 of the embodiment, the amount of the second microstructure 31 of the upper polarizer 30 is same as the first microstructure 21 of the cover 20. The location of each of the second microstructure 31 of the upper polarizer 30 is corresponding to the first microstructure 21 of the cover 20. That is, each concave of the second microstructures 31 is disposed below the first concave of the microstructures 21, the first microstructures 21 and the second microstructures 31 have the same curvature radius or with minimal deviations, and the second The microstructures 31 are particles, the radii of curvature of the first microstructures 21 and the second microstructures 31 are both in the range of 10 μm-50 μm, the sizes of the first microstructures 21 and the second microstructures 31 are the same as the pixel sizes, and the second microstructures 31. The refractive index of the structure 31 is about 1.5 times that of the optical adhesive layer P, so that the light emitted from the second microstructure 31 can be completely emitted into the first microstructure 21 immediately above it, achieving mutual complementation.

In the ideal case, the light from the display panel 10 is in parallel. When the light is emitted out from the display panel 10 and passed through the upper polarizer 30, the light in parallel becomes diverse because of the second microstructures 31. Subsequently, the light is getting converse and become in parallel again due after passing through the OCA layer P and the microstructure 21 on the bottom surface of the cover 20. Due to the refractive index of the second microstructures 31 is 1.5 times of that of the OCA layer P, in the present embodiment, the cover 20 is made of glass, and the refractive index of the cover which made of glass is 1.5 times of that of air. The refractive indices of two intermediate layers are substantially the same. Therefore, the refractive angle of the light in these two materials are substantially the same. Moreover, because the second microstructures 31 on the upper polarizer 30 are substantially complementary to the first microstructures 21 on the cover 20 and these two microstructures have the same size as the pixel, it can improve the sparkle situation on the cover. Besides, the concave of the second microstructures 31 make the ambient light have a diffuse reflection while the ambient light emitted to the surface of the second microstructures 31 to ensure the anti-dazzle effect.

Figure 3:
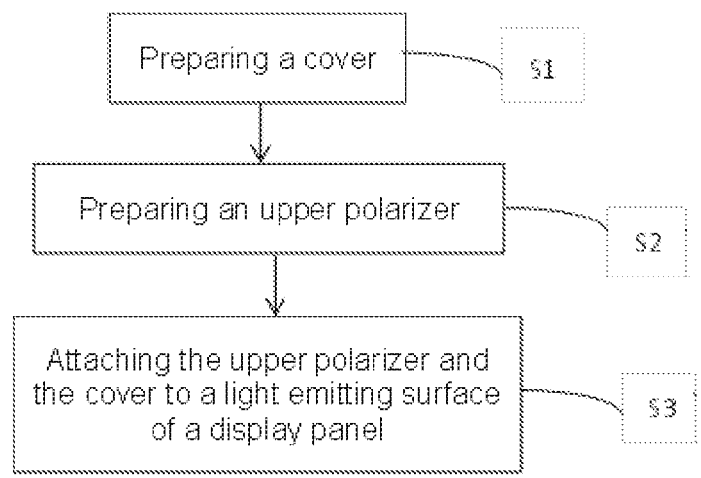
FIG. 3 is a flow chart of a manufacturing method of a display module according to a first embodiment of the present invention.
Figure 4:
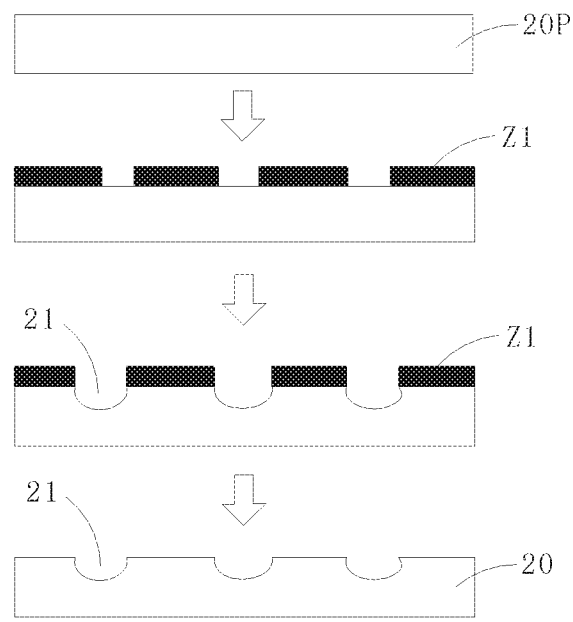
FIG. 4 is a schematic diagram of the manufacturing process of the cover of the first embodiment of the present invention.
Figure 5:
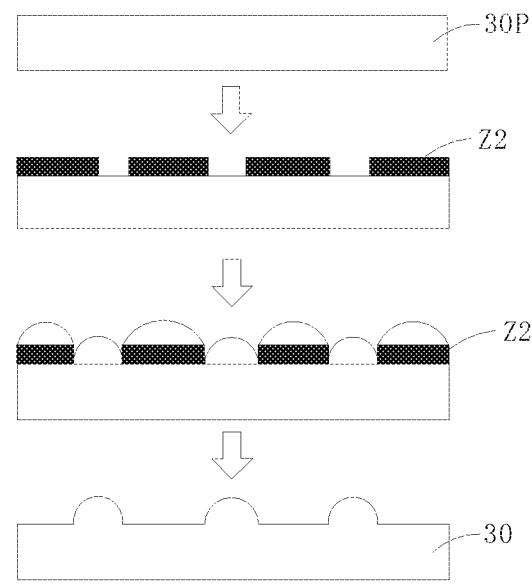
FIG. 5 is a schematic diagram of the manufacturing process of the upper polarizer of the first embodiment of the present invention.

Referring to FIG. 3 to FIG. 5, the FIG. 3 is a flow chart of a manufacturing method of a display module of the present embodiment. FIG. 4 is a schematic diagram of the manufacturing process of the cover of the present embodiment. FIG. 5 is a schematic diagram of the manufacturing process of the upper polarizer of the present embodiment. The manufacturing method of the display module of the present embodiment mainly comprises:

S1, preparing a cover 20.

Referring to FIG. 4, the steps of preparing the cover 20 comprises:

providing a transparent plate 20P which needs to be cleaned in advance to remove impurities such as surface dust, particles and the like.

depositing a first hard mask layer Z1 on a transparent plate 20P by vapor deposition. The thickness of the first hard mask layer Z1 is 100 nm-500 nm. The first mask layer Z1 uses a mask-like mask for the vapor deposition process, and the first mask layer Z1 is a material that is acid and corrosion resistant.

By etching the transparent plate 20P, the microstructures 21 having a concave surface are formed on region of the transparent plate 20P which is not covered by the first hard mask Z. The etchant is selected from the mixture with HF. During the etching, a plurality of concave microstructures with the curve surface are formed on the region of the cover being not covered by the first hard mask Z1 and have a curvature radius in the range of 10 μm-50 μm.

Then, the first hard mask Z1 is removed, and the cover with first microstructures which can improve dazzle effect is formed.

S2, preparing an upper polarizer 30.

Referring to FIG. 5, the steps of preparing the upper polarizer 30 is similar with the cover 20, but the main differences are:

depositing a second hard mask Z2 on an upper surface of the upper polarizer 30P by vapor deposition and the second hard mask Z2 has same picture with the first hard mask Z1.

etching the transparent plate to form a first microstructure having a curved concave on a region of the transparent plate which is not covered by the first hard mask. The spraying particles is inorganic particle which is mixed in inorganic particle in advance. The curvature radius of the particles is substantially the same with first microstructure 21. The size of the curvature radius of the particles is 10 μm-50 μm and the reflective index of the particles is 1.5 times of the optical glue layer.

By reinforce treatment, the adhesion between the inorganic particles and the upper polarizer 30 is enhanced. Subsequently, the second hard mask Z2 is removed with the solvent. The upper polarizer 30 with the second microstructures 31 having convex on the surface of the polarizer 30P is formed.

Step S3, attaching the cover 20 and the upper polarizer 30 to the light emitting surface of the display panel 10 to make the upper polarizer 30 is san-witched between the display panel 10 and the cover. An optical glue layer P is adapted for the intermediate material between the cover 20 and the upper polarizer 30 and the gap between the cover 20 and the upper polarizer 30 is squeezed out.

Embodiment 2

Figure 6:
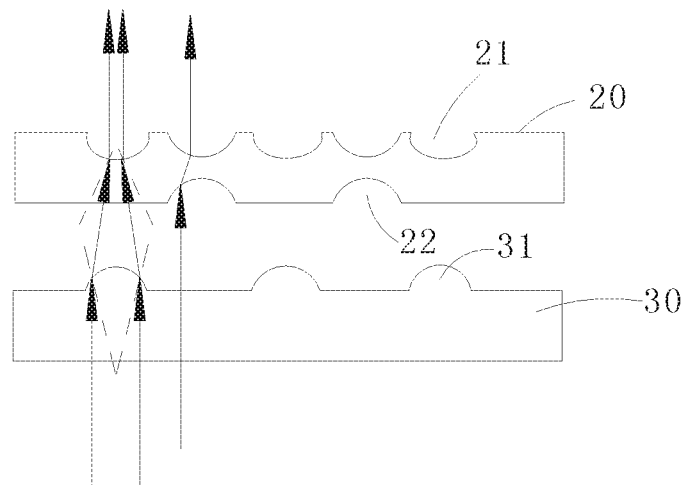
FIG. 6 is a schematic view of the cooperation between the cover and the upper polarizer of the second embodiment of the present invention.

Referring to FIG. 6 which is different from the first embodiment. The cover 20 in this embodiment has the surface of the first microstructure 21, and the inner surface ("the lower surface of FIG. 6) has a curved concave surface of the third microstructure 22. The amount of the first microstructure 22 is the sum of the second microstructure 31 and third mircostructure 22. Each first microstructure 21 of the surface of the cover 20 is corresponding to a second microstructure 31 or a third microstructure 22.

In another preferred embodiment, the projecting image of each of the third microstructures 22 is neighboring to two of the second microstructures 31. That is, the third microstructures 22, the second microstructures 31 are disposed alternatively on the horizontal surface. The curvature radius of the first microstructures 21, the second microstructures 31, and the third microstructures 32 are the same.

Accordingly, after the first microstructures 21 are formed of the preparation process of the cover 20, the transparent plate is flipped over to make it upside down. The third hard mask layer is formed on the bottom surface with vaper deposition technology. The material and the thickness of the third hard mask are the same as the first hard mask layer Z1. The pattern of the third hard mask is different from the first hard mask Z1. The second microstructures 31 on the upper polarizer 30 is corresponding to region of the transparent plate 20P with the third hard mask layer covered. A through hole is disposed on the corresponding area of the flat area of the transparent plate 20P which is between the two second microstructures 31 on the upper polarizer 30. Then, an etching process is performed on the transparent plate 20P with the third hard mask disposed on. The third microstructures 22 with a concave surface are formed on the region of the transparent plate 20P which is not covered with the third hard mask. The third hard mask layer is removed with solvent subsequently and the cover 20 with the first microstructures 21 and the third microstructures 22 are formed.

It can improve the sparkle effect of the cover to realize the anti-dazzle function because each of the first microstructures 21 is corresponding to a second microstructure 31 or a third microstructure 22 or the second microstructures 31 and the third microstructures 22 have supplementary to the first microstructures 21.

Embodiment 3

Figure 7:
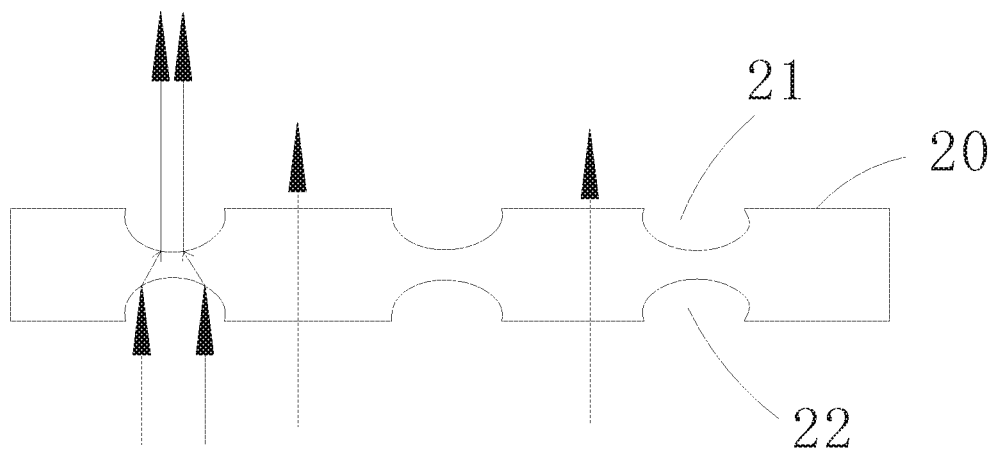
FIG. 7 is a schematic diagram of the cooperation between the cover and the upper polarizer according to the third embodiment of the present invention.

With reference to FIG. 7, in the display module of the present embodiment, the cover 20 is disposed along the light emitting direction of the display panel. The first microstructures 21 with concave surfaces are formed on the outside surface of the cover 20. It's slightly different from the first embodiment and the second embodiments. There are the third microstructures 22 with concave surface formed on the inner surface of the cover 20. The third microstructures 22 are corresponding to the first microstructures 21. Because the anti-dazzle treatment of the upper polarizer 30, the lower polarizer is no longer necessary.

In the present embodiment, the first microstructure 21 and the third microstructures 22 are corresponding to each other in position and quantities. Moreover, the curvature radius and size of the first microstructure 21 and the third microstructures 22 are the same. That is, the first microstructure 21 and the third microstructures 22 are allocated on the upper surface and the bottom surface of the cover 20 symmetrically. The parallel light emitted from display panel 10 to the bottom surface of the cover would be converse due to the third microstructure 22. When the light passed through the first microstructures 21, the light becomes the parallel light again. The sparkle effect is improved because of the complementary of the first microstructures 21 and the third microstructures.

In summary, in the present invention, the cover of the display module and the surface of the upper polarizer are subjected to a special anti-glare surface treatment so that the microstructure on the surface of the cover and the microstructure of the surface of the upper polarizer form a substantially complementary relationship to achieve better anti-glare effect. To a certain extent, it eliminates speckle phenomenon and does not significantly increase the difficulty of the process. It is conducive to the promotion and application of health eye display technology.

The above descriptions are merely specific implementation manners of the present application. It should be noted that those skilled in the art may make some improvements and modifications without departing from the principle of the present application. These improvements and modifications should be regarded as the scope of protection of this application.

What is claimed is:

1. A manufacturing method of a display module, comprising:
preparing a cover, comprising:
depositing a first hard mask layer on a transparent plate by vapor deposition;
etching the transparent plate to form a first microstructure having a curved concave on a region of the transparent plate which is not covered by the first hard mask; and
removing the first hard mask;
preparing an upper polarizer, comprising:
depositing a second hard mask on an upper surface of the upper polarizer by vapor deposition; and
spraying particles on the upper polarizer with the second hard mask;
attaching the upper polarizer and the cover to a light emitting surface of a display panel, wherein the upper polarizer is located between the display panel and the cover.

2. The manufacturing method according to claim 1, wherein the cover is attached to the upper polarizer with an optical glue layer.

3. The manufacturing method according to claim 2, wherein the particles in the step of spraying particles on the upper surface and the upper polarizer is the inorganic particle mixed in the organic solvent.

4. The manufacturing method according to claim 3, wherein the curvature radius of the particles is 10 μm-50 μm and the reflective index of the particles is 1.5 times of the optical glue layer.

5. The manufacturing method according to claim 1, wherein the thickness of the first hard mask is 100 nm-500 nm.

6. The manufacturing method according to claim 5, wherein the curvature radius of the first microstructure is 10 μm-50 μm.

* * * * *